United States Patent
Jia et al.

(10) Patent No.: US 12,547,491 B2
(45) Date of Patent: Feb. 10, 2026

(54) MEMORY FAILURE PROCESSING METHOD AND APPARATUS, AND COMPUTER DEVICE AND STORAGE MEDIUM

(71) Applicant: Suzhou MetaBrain Intelligent Technology Co., Ltd., Suzhou (CN)

(72) Inventors: Shuaishuai Jia, Suzhou (CN); Daotong Li, Suzhou (CN); Hongrui Han, Suzhou (CN); Yandong Chen, Suzhou (CN); Shengxin Li, Suzhou (CN)

(73) Assignee: Suzhou MetaBrain Intelligent Technology Co., Ltd., Suzhou (CN)

( * ) Notice: Subject to any disclaimer, the term of this patent is extended or adjusted under 35 U.S.C. 154(b) by 0 days.

(21) Appl. No.: 19/115,438

(22) PCT Filed: Feb. 28, 2024

(86) PCT No.: PCT/CN2024/078976
§ 371 (c)(1),
(2) Date: Mar. 26, 2025

(87) PCT Pub. No.: WO2024/260013
PCT Pub. Date: Dec. 26, 2024

(65) Prior Publication Data
US 2025/0258735 A1 Aug. 14, 2025

(30) Foreign Application Priority Data
Jun. 20, 2023 (CN) .......................... 202310730755.6

(51) Int. Cl.
*G06F 11/00* (2006.01)
*G06F 11/07* (2006.01)
(52) U.S. Cl.
CPC ........ *G06F 11/0793* (2013.01); *G06F 11/073* (2013.01)

(58) Field of Classification Search
CPC .......................... G06F 11/073; G06F 11/0793
See application file for complete search history.

(56) References Cited

U.S. PATENT DOCUMENTS

| 6,119,248 A | 9/2000 | Merkin | |
|---|---|---|---|
| 8,468,422 B2 * | 6/2013 | Chessin | G06F 11/1044 714/763 |

(Continued)

FOREIGN PATENT DOCUMENTS

| CN | 111008091 A | 4/2020 |
|---|---|---|
| CN | 113064745 A | 7/2021 |

(Continued)

OTHER PUBLICATIONS

International Search Report of corresponding PCT application (PCT/CN2024/078976) Jun. 6, 2024 including English translation (7 pages).

(Continued)

*Primary Examiner* — Joshua P Lottich
(74) *Attorney, Agent, or Firm* — Crowell & Moring LLP

(57) ABSTRACT

The present application relates to a memory failure processing method and apparatus, and a computer device and a storage medium. The method includes: acquiring correctable error information of a memory; performing an out-of-band memory failure prediction operation according to the correctable error information; according to a prediction result, determining whether to trigger a system control interrupt; in response to the system control interrupt, calling a PRM processing module to acquire memory failure address information corresponding to the triggering of the system control interrupt; and performing an address isolation operation according to the memory failure address information.

17 Claims, 5 Drawing Sheets

(56) References Cited

U.S. PATENT DOCUMENTS

| | | | | |
|---|---|---|---|---|
| 2005/0081114 | A1* | 4/2005 | Ackaret | G06F 11/3024 714/E11.004 |
| 2015/0095606 | A1* | 4/2015 | Nikolayevich | G06F 3/0671 711/168 |
| 2015/0269017 | A1* | 9/2015 | Ellis | G06F 11/0793 714/42 |
| 2016/0224412 | A1* | 8/2016 | Healy | G06F 11/1024 |
| 2016/0239663 | A1* | 8/2016 | Healy | G06F 11/076 |
| 2021/0263868 | A1 | 8/2021 | Maddukuri et al. | |
| 2023/0176979 | A1* | 6/2023 | Shulyak | G06F 12/1036 711/205 |
| 2023/0222025 | A1* | 7/2023 | Kumar | G06F 11/073 714/47.1 |
| 2024/0362099 | A1* | 10/2024 | Bower, III | G06F 11/0709 |

FOREIGN PATENT DOCUMENTS

| | | |
|---|---|---|
| CN | 115114066 A | 9/2022 |
| CN | 115629905 A | 1/2023 |
| CN | 115729742 A | 3/2023 |
| CN | 116089147 A | 5/2023 |
| CN | 116483612 A | 7/2023 |

OTHER PUBLICATIONS

Written Opinion of International Searching Authority of corresponding PCT application (PCT/CN2024/078976) Jun. 6, 2024 including English translation (9 pages).

Search report of corresponding CN priority application (CN202310730755.6) Jul. 26, 2023 (2 pages).

First Office Action of corresponding CN priority application (CN202310730755.6) Jul. 29, 2023 including English translation (13 pages).

2nd Office Action of corresponding CN priority application (CN202310730755.6) Aug. 22, 2023 including English translation (9 pages).

Notification to Grant Patent Right for Invention of corresponding CN priority application (CN202310730755.6) Sep. 14, 2023 including English translation, and including allowed claims and English translation of the allowed claims of corresponding CN Priority Application No. CN202310730755.6 (15 pages).

* cited by examiner

MEMORY FAILURE PROCESSING METHOD AND APPARATUS, AND COMPUTER DEVICE AND STORAGE MEDIUM

CROSS-REFERENCE TO RELATED APPLICATION

This application is the national phase application of International Application No. PCT/CN2024/078976, filed Feb. 28 2024, which claims priority to Chinese Patent Application No. 2023107307556, entitled "MEMORY FAILURE PROCESSING METHOD AND APPARATUS, AND COMPUTER DEVICE AND STORAGE MEDIUM" filed with the China National Intellectual Property Administration filed on Jun. 20, 2023. The contents of International Application No. PCT/CN2024/078976 and Chinese Patent Application No. 2023107307556 are incorporated herein by reference in their entireties.

FIELD

The present application relates to a memory failure processing method and a computer device.

BACKGROUND

Memory failure is one of the most prevalent causes of server halt. To process a Correctable Error (CE) in memory, a conventional method is to trigger, by a server, a System Management Interrupt (SMI) upon detecting a memory error, thereby causing a Central Processing Unit (CPU) to enter a System Management Mode (SMM) for subsequent error processing and reporting. In some embodiments, another method involves initially connecting the CPU's Error pin to a General Purpose input output (GPIO) of the Platform Controller Hub (PCH) in hardware and configuring the GPIO to enable it to generate a System Control Interrupt (SCI). Subsequently, upon detection of a memory error, the CPU controls the GPIO to generate an SCI via the Error pin, and upon generation of the SCI, a Platform Runtime Mechanism (PRM) module within the Basic Input Output System (BIOS) code is called to conduct error processing and reporting.

The inventors have recognized that the aforementioned former method may cause the CPU to enter the SMM, which could degrade system performance; whereas the latter method necessitates hardware modifications, rendering it inconvenient to implement.

SUMMARY

According to various embodiments disclosed in the present application, a first aspect of the present application provides a memory failure processing method, where in some embodiments, the method includes:
  acquiring correctable error information of a memory;
  performing an out-of-band memory failure prediction operation according to the correctable error information;
  according to a prediction result, determining whether to trigger a system control interrupt;
  in response to the system control interrupt, calling a PRM processing module to acquire memory failure address information corresponding to the triggering of the system control interrupt; and
  performing an address isolation operation according to the memory failure address information.

According to various embodiments disclosed in the present application, a second aspect thereof provides a memory failure processing apparatus including:
  a first error information acquisition module configured to acquire correctable error information of a memory;
  a failure prediction module configured to perform an out-of-band memory failure prediction operation according to the correctable error information;
  a control interrupt trigger module configured to determine whether to trigger a system control interrupt according to a prediction result;
  a failure address acquisition module configured to, in response to the system control interrupt, call a PRM processing module to acquire memory failure address information corresponding to the triggering of the system control interrupt; and
  an address isolation module configured to perform an address isolation operation according to the memory failure address information.

According to various embodiments disclosed in the present application, a third aspect of the present application provides a computer device, which, in some embodiments, includes a memory, a first processor, a second processor, and a RAM, where the memory stores an operating system and a basic input output system executed by the first processor, and BMC firmware executed by the second processor.

The second processor is configured to acquire correctable error information of a memory; perform an out-of-band memory failure prediction operation according to the correctable error information; according to a prediction result, determine whether to trigger a system control interrupt;

the first processor is configured to, in response to the system control interrupt, call a PRM processing module to acquire memory failure address information and perform an address isolation operation according to the memory address information.

BRIEF DESCRIPTION OF THE DRAWINGS

To describe the technical solutions of the embodiments of the present application more clearly, the following briefly introduces the accompanying drawings required for describing the embodiments. Apparently, the accompanying drawings in the following description show only some embodiments of the present application, and a person of ordinary skill in the art may still derive other drawings from these accompanying drawings without creative efforts.

DETAILED DESCRIPTION

Figure 1:
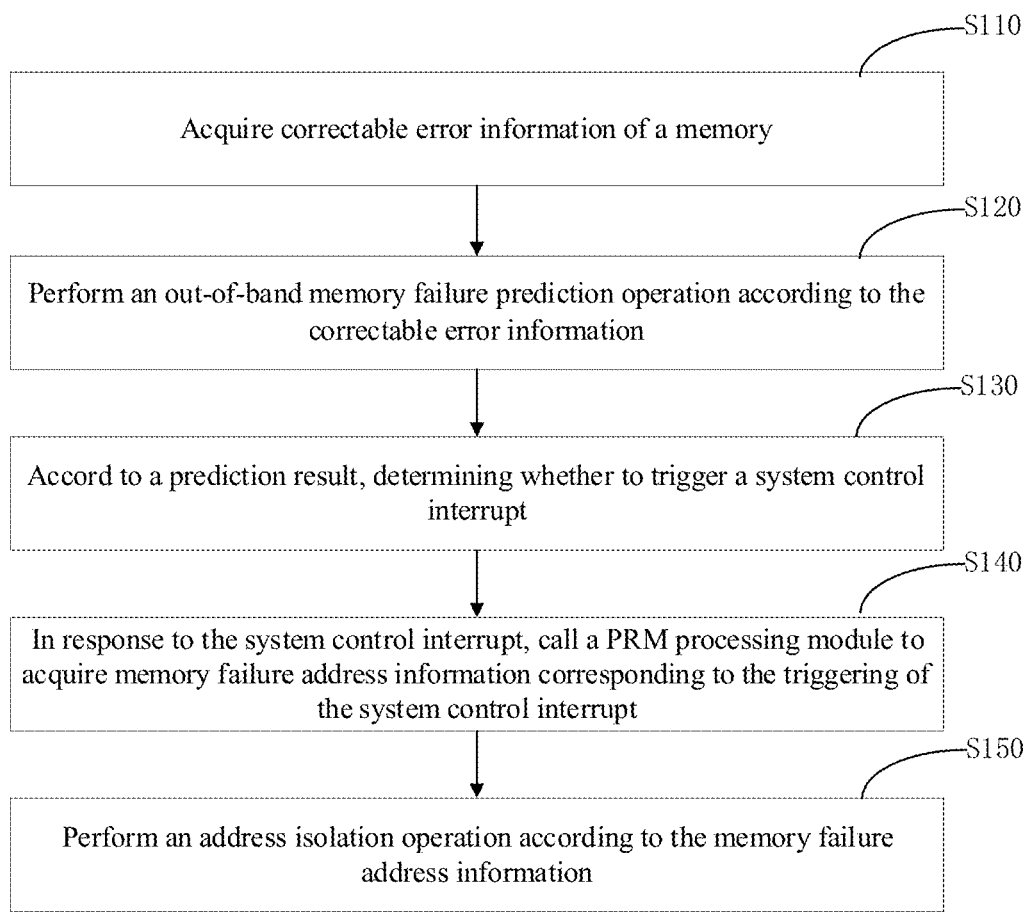
FIG. 1 is a schematic flow chart of a memory failure processing method according to one or more embodiments of the present application.

The present application will be further described in detail below with reference to the accompanying drawings and embodiments. It should be understood that the particular embodiments described herein are illustrative only and are not restrictive.

To make the objectives, technical solutions, and advantages of the present application clearer, the following further describes implementations of the present application in detail with reference to the accompanying drawings. It should be clear that the described embodiments are merely part of the embodiments of the present application and not all embodiments. According to the embodiments in the present application, all other embodiments obtained by a person skilled in the art without involving any inventive effort are within the protection scope of the present application.

Where the following description refers to the accompanying drawings, like numbers in different drawings indicate the same or similar elements, unless otherwise indicated. The exemplary embodiments described in the following examples do not represent all embodiments consistent with the present application. Rather, they are merely examples of apparatus and methods consistent with certain aspects of the present application as detailed in the appended claims.

In the description of the present application, it should be understood that the terms "first", "second", "third", and the like are used solely to distinguish between similar elements and are not necessarily intended to describe a specific sequence or order, nor should they be construed as indicating or implying relative importance. For a person skilled in the art, the specific meaning of the above terms in the present application may be appreciated according to specific situations. Further, in the description of the present application, unless otherwise specified, the term "a plurality of" refers to two or more. "And/or", describing an associated relationship of an associated object, indicates that there may be three relationships, for example, A and/or B, may indicate: the presence of A alone, the presence of both A and B, or the presence of B alone. The character "/" in this specification generally indicates an "or" relationship between the associated objects.

The following provides an explanation of certain technical terms used herein.

BIOS: Basic Input Output System
UCE: Uncorrectable Error Information
CE: Correctable Error Information
CPER: Common Platform Error Record
ACPI: Advanced Configuration and Power Management Interface
APEI: ACPI Platform Error Interface
MRT: Memory Resilience Technology
PRM: Platform Runtime Mechanism
SCI: System Control Interrupt
SMI: System Management Interrupt
SMM: System Management Mode
GHES: Generic Hardware Error Source
HEST: Hardware Error Source Table
GUID: Globally Unique Identifier
BMC: Baseboard Management Controller
MMBI: Memory Mapped BMC Interface
PMIC: Power Management IC
RAS: refers to an RAS technology, and RAS refers to reliability, availability, and serviceability of the computer system.
OS: Operating System
PRMT: Platform Runtime Mechanism Table Further, as might be understood from the Background, the SMI causes the CPU to enter the SMM, and the SMM results in a degradation of system performance for the following reasons: the SMI is a global/broadcast event that suspends all CPU cores; upon receiving the SMI, all CPU threads in the system immediately enter the SMM mode after completing the current instruction; once in the SMM operation mode, the threads become unavailable to the operating system and remain suspended until they are released back to the operating system by an SMM handler. In addition, the SMM has the following defects:

(1) SMM poses safety risks. The SMM code is invisible to the OS, and the OS is unable to verify or audit the SMM handler, and resources locked by the operating system might be operated within the SMM, which is unsafe.

(2) Complexity of SMI. Since SMI needs to address the asynchronous synchronization issue, the SMM handler must process various types of interrupts, such as eMCA, CSMI, and MSMI, etc., which contribute to the complexity of SMI. In severe cases, improper processing may lead to system kernel errors (Kernel panic).

(3) Updating the SMM code necessitates a full platform restart.

The memory failure processing method provided by the embodiments of the present application will be described in detail below.

Referring to FIG. 1, the steps S110-S150 of the memory failure processing method provided by some embodiments of the present application are illustrated. The memory failure processing method provided by the embodiment of the present application might be applied to a server, which at least includes a memory storing BMC firmware (Baseboard Management Controller), an operating system, a basic input output system, and other programs, a first processor, and a second processor, where the first processor is configured to execute the operating system, the basic input output system, and other programs, and the second processor is configured to execute the BMC firmware. In the embodiment of the present application, steps S110-S130 are operations performed by the second processor executing the BMC firmware, and steps S140-S150 are operations performed by the first processor executing programs such as an operating system and a basic input output system. The second processor executing the BMC firmware is the baseboard management controller.

In the embodiments of the present application, the computational load on the CPU is alleviated by the baseboard management controller acquiring correctable error information of the memory out-of-band and performing memory failure prediction to assess whether the correctable errors occurring in the memory pose a risk of system crash. Additionally, a PRM technology is used to acquire memory address information associated with the failed memory chip internal components from the BMC and report it to the operating system, enabling the operating system to isolate the relevant memory address information, thereby inhibiting memory failures. A PRM technology might be used to prevent triggering of system management interrupts, thereby avoiding the CPU from entering the system management mode. Consequently, the operations related to failure processing will not impact system performance, nor will they introduce other potential drawbacks associated with the system management mode. Further, when using the PRM technology, the embodiment of the present application appropriately modifies the software architecture to eliminate the need for hardware adjustments. This enables the calling of the PRM processing module via the PRM interface to perform operations related to collecting correctable error information from the memory. Since hardware modifications are not required for implementing the embodiments of the present application, it is implemented with greater convenience.

Detailed descriptions of steps S110-S150 are provided below.

S110 Acquire correctable error information of a memory.

S120 Perform an out-of-band memory failure prediction operation according to the correctable error information.

S130 According to a prediction result, determine whether to trigger a system control interrupt.

Figure 2:
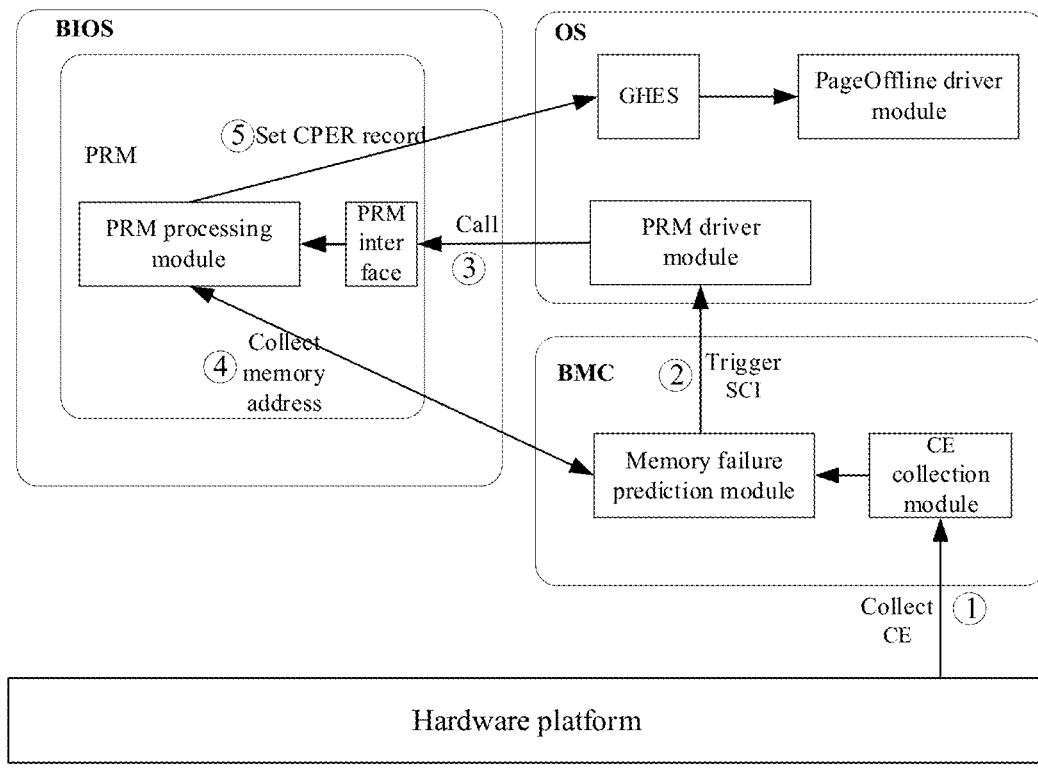
FIG. 2 is a schematic diagram illustrating interactions among a baseboard management controller, an operating system, and a basic input output system in processing a correctable error according to one or more embodiments of the present application.

In some embodiments, as might be seen from FIG. 2, the interactions among the operating system, the basic input output system, and the baseboard management controller during the processing of correctable errors in memory might be seen. The baseboard management controller in the present embodiment includes a memory failure prediction module and a CE collection module. The memory failure prediction module may be a Memory Failure Prediction program, and the CE collection module may be a Memory CE collection program.

When the CE collection module collects the Correctable Error information (CE) of the memory, it instructs the memory failure prediction module to perform an out-of-band memory failure prediction operation, which involves analyzing whether the collected CE will cause the memory to generate a Uncorrectable Error information (UCE), i.e., a risk of system crash. If so, the relevant memory failure address is isolated to inhibit the memory failure and prevent the occurrence of UCE in subsequent memory operations. If the prediction result of the out-of-band memory failure prediction operation indicates a risk of system crash, the memory failure prediction module triggers a system control interrupt to the operating system; if the prediction result of the out-of-band memory failure prediction operation indicates no risk of system crash, the memory failure prediction module only needs to record the currently collected CEs without triggering the system control interrupt. Upon subsequent collection of CEs, the memory failure prediction module may further perform an out-of-band memory failure prediction operation in conjunction with the pre-recorded CEs.

The aforementioned out-of-band memory failure prediction operations may be implemented using any out-of-band memory failure prediction technology, such as an MRT technology. The MRT technology is a memory RAS technology utilized for analyzing and predicting memory failures and isolating failure bits.

The memory includes a plurality of memory modules, each of which includes a plurality of Channels, each Channel includes a plurality of Ranks, each Rank includes a plurality of Banks, each Bank is a matrix formed by multiple rows and columns of cells, and the English terms for "rows" and "columns" in the Bank are Row and Column, respectively. Taking as an example the memory modules of Dual-Inline-Memory-Modules (DIMM), when a correctable error occurs in the memory, the hardware platform generates a CE, which includes the memory address information where the error occurs. This memory address characterizes a physical address in Row and Column in a Bank in a Rank in a Channel in a DIMM. The memory chip internal component includes cells and rows, where the cells may be the aforementioned cell and the rows may be the aforementioned Row.

If the MRT technology is used to execute the aforementioned out-of-band memory failure prediction operation, the prediction result will encompass the error type associated with the memory address information in the CE. Accordingly, the specific operation of determining whether to trigger a system control interrupt according to a prediction result may include: it is determined whether the error type characterized by the prediction result is a specific error type, where the specific error type includes a risky cell error, a risky row error, and a risky chip failure; if the error type characterized by the prediction result is a specific error type, the system control interrupt is triggered; if the error type characterized by the prediction result is not a specific error type, the system control interrupt does not need to be triggered.

Further, the method of triggering the system control interrupt might be any of various common triggering methods, and an appropriate triggering method might be flexibly selected according to actual application scenarios. For example, the baseboard management controller may trigger a system control interrupt through a general GPIO; as another example, the baseboard management controller may trigger a system control interrupt via a virtual wire (e.g., eSPI virtual wire). The aforementioned methods for triggering the system control interrupt might be implemented without the need to in some embodiments connect the error pin of the CPU and the GPIO of the PCH, thereby offering greater convenience in implementation. Further, while the related art is limited to triggering the SCI through the error pin of the CPU, the embodiments of the present application might trigger the SCI in multiple ways, thus providing enhanced flexibility.

S140 In response to the system control interrupt, call a PRM processing module to acquire memory failure address information corresponding to the triggering of the system control interrupt.

S150 Perform an address isolation operation according to the memory failure address information.

Upon entering the SMM, the CPU will suspend all its cores and proceed to execute the SMI handler, resulting in significant system resource wastage and adversely impacting system performance. According to the embodiments of the present application, the PRM technology is used to replace the SMI handler, thereby preventing the CPU from entering the SMM. The PRM technology enables dynamic allocation of CPU cores, thereby effectively addressing the aforementioned issue of system performance degradation.

After the baseboard management controller triggers a system control interrupt, the operating system calls the PRM processing module in a Basic Input Output System (BIOS) via the PRM interface to collect relevant memory failure address information and perform an address isolation operation on the collect memory failure address information. The aforementioned PRM processing module is a PRM Handler program within the BIOS code.

In some embodiments, the calling the PRM processing module to acquire memory failure address information corresponding to the triggering of the system control interrupt includes: the PRM processing module is called via a PRM interface, enabling the PRM processing module to acquire the memory failure address information corresponding to the triggering of the system control interrupt.

In the present embodiment, the operating system calls the PRM processing module in the basic input output system via the PRM interface to acquire the relevant memory failure address information from the baseboard management controller.

The operating system includes a PRM driver module. The aforementioned PRM interfaces refer to an ACPI Lxx Method and a Bridge Driver. When the operating system calls the ACPI Lxx Method, the PRM driver module subsequently calls the ACPI Lxx Method.

In some embodiments, when the operating system calls the PRM processing module via the PRM interface, it first calls the ACPI Lxx Method, which transfers a globally unique identifier of the PRM processing module to the Bridge Driver, and subsequently, the Bridge Driver activates the PRM processing module according to the globally unique identifier.

The ACPI Lxx Method transmits the globally unique identifier of the PRM processing module to the Bridge Driver while transmitting the globally unique identifier of the PRM processing module to a PRM buffer, and then the Bridge Driver acquires the globally unique identifier from the PRM buffer.

When the Bridge Driver initiates the PRM processing module according to the globally unique identifier, the Bridge Driver obtains the first address of the PRM processing module by querying from a first preset table, i.e., the PRMT table, within the operating system using the globally unique identifier (GUID), and subsequently calls the PRM processing module according to the first address.

By referring to a Register Manual, it is evident that the CPU includes certain privileged instructions or in/out (I/O) operations that explicitly require access in an SMM mode, as well as instructions or register operations that do not necessitate operation in the SMM mode. For the processing of correctable memory errors, the required instructions or register operations do not indicate that they must be performed in the SMM mode. Therefore, the embodiments of the present application utilize the PRM technology to replace the SMI, thereby preventing the CPU from entering the SMM. In the related art, an SMI handler maintains transparency to an operating system through abstract interfaces such as ACPI and UEFI. In the embodiments of the present application, a PRM processing module is implemented in the BIOS code to replace the SMI handler, while retaining the aforementioned abstract interfaces. Additionally, an interface (referred to as the PRM interface) is provided in the BIOS code for calling the PRM processing module from ACPI, thereby ensuring that the PRM processing module remains transparent to the operating system.

Further, the PRM processing module, in response to a call from the operating system, acquires the relevant memory failure address information from the baseboard management controller and transmits the memory failure address information to the operating system.

Upon calling of the PRM processing module, the baseboard management controller interacts to acquire relevant memory failure address information from the baseboard management controller and transmits the memory failure address information to the operating system. The PRM processing module is configured to communicate with the baseboard management controller through a specific interface such as IPMI, H2B, or MMBI, thereby obtaining a CE that may pose a risk of system crash from the baseboard management controller, and subsequently extracting relevant memory failure address information from the CE.

When the PRM processing module transmits the memory address information to the operating system, the memory address information is recorded in a second preset table, i.e., the HEST table in the operating system, and a CPER identifier is set in the HEST table, thereafter, the operating system might obtain the memory address information from the HEST table. In some embodiments, the PRM processing module creates a CPER according to the CE acquired from the baseboard management controller, where an error field in the CPER must be set to bit3 to instruct the operating system to cease using the associated error source. Subsequently, the information recorded in the CPER is written into a GHES field of the HEST table in the operating system. Thereafter, the operating system obtains the aforementioned memory address information by querying the HEST table.

Further, the operating system includes a PageOffline driver module. When the operating system executes an address isolation operation according to the memory address information, the PageOffline driver module acquires the memory address information from the HEST table and performs the address isolation operation on the memory address information.

In the aforementioned embodiments of the present application, the computational load on the CPU is alleviated by the baseboard management controller acquiring correctable error information of the memory out-of-band and performing memory failure prediction to assess whether the correctable errors occurring in the memory pose a risk of system crash. Additionally, a PRM technology is used to acquire memory address information associated with the failed memory chip internal components from the BMC and report it to the operating system, enabling the operating system to isolate the relevant memory address information, thereby inhibiting memory failures. By utilizing the PRM technology, the triggering of a system management interrupt might be avoided, thereby preventing the CPU from entering the system management mode. Therefore, the operations related to failure processing will not impact the system performance. However, when using the PRM technology, the embodiment of the present application appropriately modifies the software architecture to eliminate the need for hardware adjustments. This enables the calling of the PRM processing module via the PRM interface to perform operations related to collecting error information from the memory. Since hardware modifications are not required for implementing the embodiments of the present application, it is implemented with greater convenience.

In some embodiments, when a correctable error occurs in the memory, the baseboard management controller may collect the correctable error information by:

(1) collecting, by the baseboard management controller, correctable error information by detecting an Error pin interrupt, where the Error pin interrupt is generated by the hardware platform when a correctable error occurs in the memory.

(2) The baseboard management controller collects the correctable error information by polling the integrated memory controller (IMC).

Figure 3:
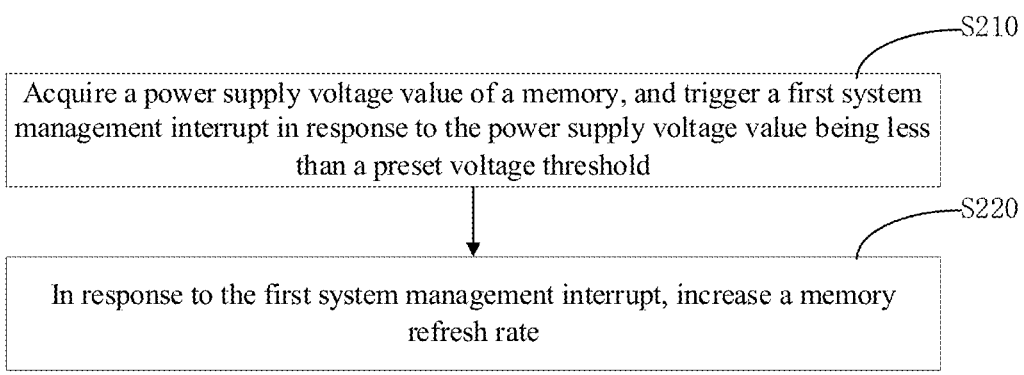
FIG. 3 is a schematic flow chart of inhibiting a memory failure according to one or more embodiments of the present application.

In some embodiments, as illustrated in FIG. 3, subsequent to acquiring the correctable error information, the method further includes steps S210-S220 as follows:

S210 Acquire a power supply voltage value of the memory, and trigger a first system management interrupt in response to the power supply voltage value being less than a preset voltage threshold.

The memory of the present embodiment is DDR5 DRAM, where DDR5 refers to a computer memory specification, and the full names of DRAM in Chinese and English are "动态随机存取存储器" and "Dynamic Random Access Memory", respectively. Accordingly, the baseboard management controller acquires a power supply voltage value of the memory, including: the baseboard management controller monitors power management integrated circuit information, i.e., PMIC information, of the memory, and acquires the power supply voltage value from the PMIC information.

The charge in the DRAM will gradually leak, potentially causing a memory failure if the voltage level of the DRAM is low.

The Power Management IC (PMIC) of DDR5 memory is an integrated circuit designed for power management, which is capable of providing, managing, controlling, and monitoring the power supply. The DDR5 PMIC is in some embodiments designed for DDR5 memory, supplies the necessary power to DDR5 memory, controls the power supply of DDR5 memory, and monitors the power supply of DDR5 memory to ensure the normal operation of DDR5 memory. The DDR5PMIC is also capable of delivering energy-saving functionality, effectively reducing the power consumption of DDR5 memory and enhancing the operational efficiency of the DDR5 memory.

Therefore, the baseboard management controller monitors the PMIC information out-of-band, and upon collecting the CE, it acquires the current power supply voltage value of the memory. If the power supply voltage value of the memory is less than a preset voltage threshold (which might be configured according to the actual scenario), the first system management interrupt is triggered.

S220 In response to the first system management interrupt, increase a memory refresh rate.

Figure 4:
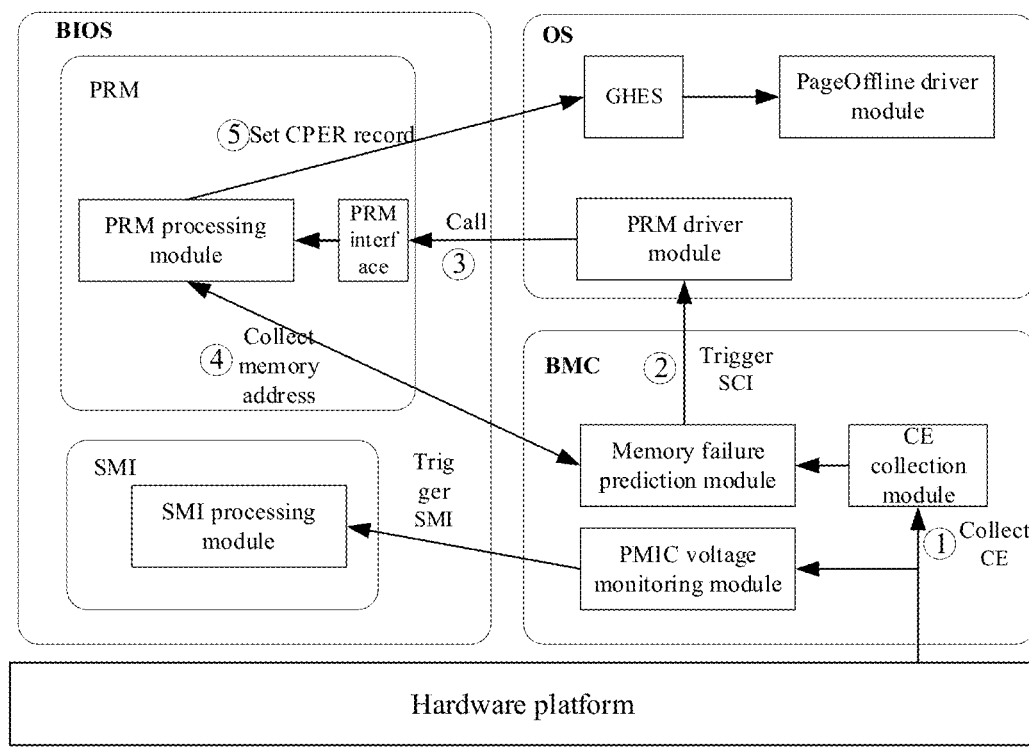
FIG. 4 is a schematic diagram illustrating interactions between a baseboard management controller and a basic input output system in processing a correctable error according to one or more embodiments of the present application.

The interaction between the Baseboard Management Controller and the SMI processing module is illustrated in FIG. 4. After the baseboard management controller triggers the first system management interrupt, the memory refresh rate is increased by the SMI processing module within the BIOS code. Enhancing the memory refresh rate might elevate the charging frequency, thereby augmenting the charge within the memory, thus achieving an objective of mitigating memory failures.

Preferably, when the SMI processing module increases the memory refresh rate, a value of the memory refresh rate is set to a target frequency value; the target frequency value is twice the specific frequency value. The aforementioned specific frequency value refers to the memory refresh rate typically configured for a memory with a normal voltage value, which may be adjusted according to specific scenarios, and the embodiments of the present application do not impose particular limitations thereon.

However, if the memory refresh rate is excessively high, it may impede the normal read speed of memory data, and if the memory refresh rate is excessively low, it may fail to timely restore the charge in the memory to the normal level, thereby compromising the memory inhibition effect, and setting the memory refresh rate to twice the normal refresh rate might effectively balance the memory inhibition effect and the data read speed.

In some embodiments, the method further includes: uncorrectable error information of the memory is acquired, a memory health scoring operation and an information display operation are performed according to the uncorrectable error information.

Figure 5:
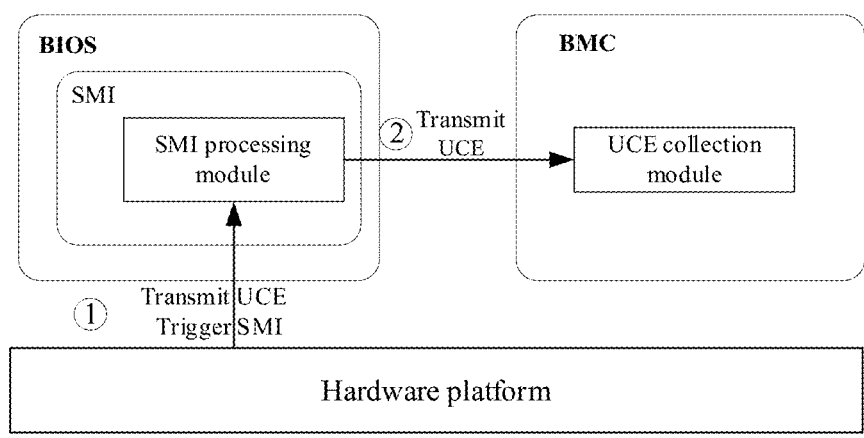
FIG. 5 is a schematic diagram illustrating interactions between a baseboard management controller and a basic input output system in processing an uncorrectable error according to one or more embodiments of the present application.

In the present embodiment, the uncorrectable error information of the memory is collected by the baseboard management controller. Accordingly, the process of collecting UCE, i.e., uncorrectable error information, by the baseboard management controller might be seen in FIG. 5. That is, when an uncorrectable error occurs in the memory, the hardware platform transmits the uncorrectable error information to the SMI processing module in the basic input output system and triggers a second system management interrupt, whereupon the SMI processing module, in response to the second system management interrupt, sends the UCE to the baseboard management controller.

According to the embodiments of the present application, the computational load on the CPU might be reduced by acquiring correctable error information of the memory and performing memory failure prediction to assess whether the correctable errors occurring in the memory pose a risk of system crash. Additionally, PRM technology is utilized to acquire relevant memory failure address information and isolate the corresponding memory failure address information to inhibit memory failure. A PRM technology might be used to prevent triggering of system management interrupts, thereby avoiding the CPU from entering the system management mode. Consequently, the operations related to failure processing will not impact system performance. Further, when using the PRM technology, the embodiment of the present application appropriately modifies the software architecture to eliminate the need for hardware adjustments. This enables the calling of the PRM processing module via the PRM interface to perform operations related to collecting memory failure error information from the memory. Since hardware modifications are not required for implementing the embodiments of the present application, it is implemented with greater convenience.

It should be noted that the various steps included in the memory failure processing method provided in any of the aforementioned embodiments are not strictly limited to a specific sequence unless explicitly stated herein, and these steps may be executed in alternative orders. Further, at least a portion of the steps may include multiple sub-steps or phases, which are not necessarily executed simultaneously but may be carried out at different timings. The execution sequence of these sub-steps or phases is not necessarily consecutive and may alternate or interleave with at least some of the sub-steps or phases of other steps.

Figure 6:
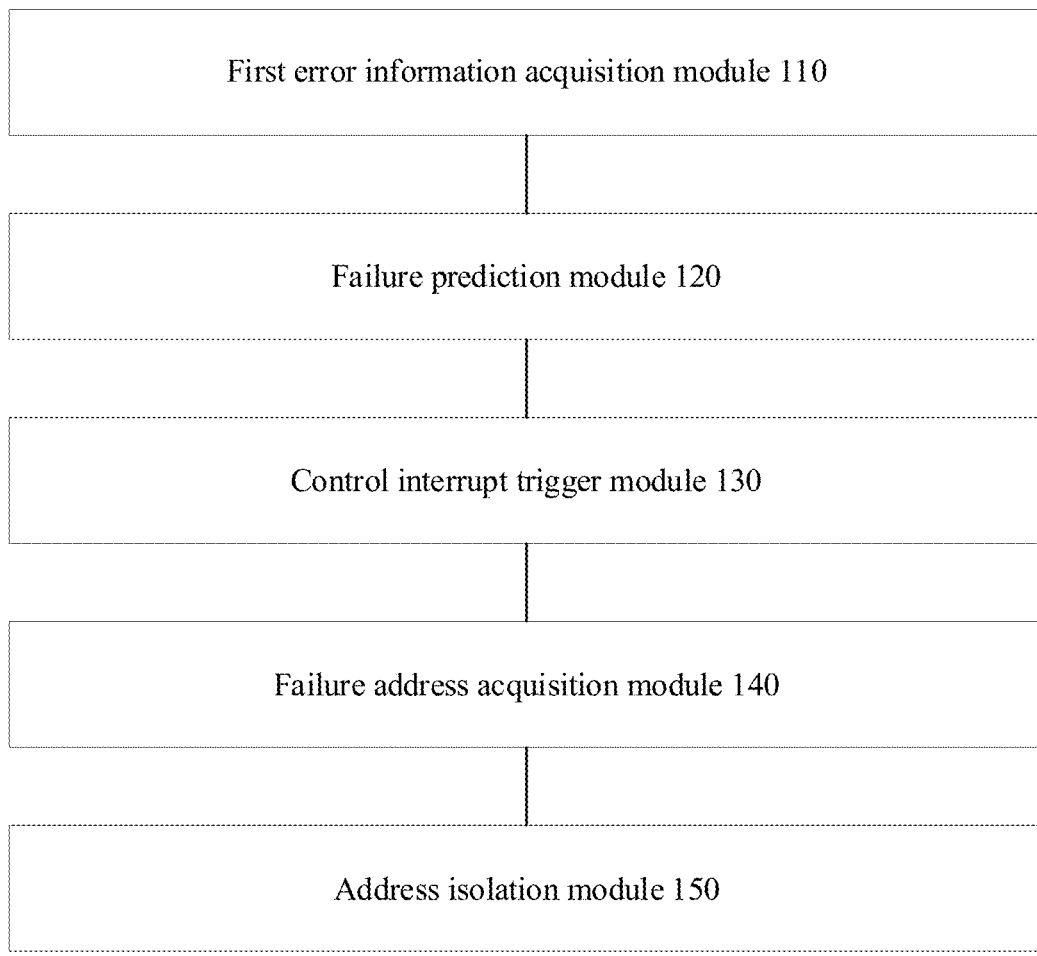
FIG. 6 is a structural block diagram of a memory failure processing apparatus according to one or more embodiments of the present application.

The present application further provides a memory failure processing apparatus corresponding to the memory failure processing method provided in the aforementioned embodiments. In some embodiments, as illustrated in FIG. 6, the apparatus includes:

a first error information acquisition module 110 configured to acquire correctable error information of a memory;

a failure prediction module 120 configured to perform an out-of-band memory failure prediction operation according to the correctable error information;

a control interrupt trigger module 130 configured to determine whether to trigger a system control interrupt according to a prediction result;

a failure address acquisition module 140 configured to, in response to the system control interrupt, call a PRM processing module to acquire memory failure address information corresponding to the triggering of the system control interrupt; and an address isolation module 150 configured to perform an address isolation operation according to the memory failure address information.

In some embodiments, the method further includes a refresh rate increasing module configured to acquire a power supply voltage value of the memory after acquiring the correctable error information, trigger a first system management interrupt in response to the power supply voltage value being less than a preset voltage threshold, and increase a memory refresh rate in response to the first system management interrupt.

In some embodiments, the apparatus further includes a memory health scoring module. A memory health scoring module configured to acquire uncorrectable error information of the memory and perform a memory health scoring operation and an information display operation according to the uncorrectable error information.

In some embodiments, the apparatus further includes a second error information acquisition module. A second error information acquisition module configured to, in response to a second system management interrupt triggered by the hardware platform upon occurrence of an uncorrectable error in the memory, acquire the uncorrectable error information generated by the hardware platform.

In some embodiments, the first error information acquisition module 110 is configured to, before acquiring uncorrectable error information, collect the correctable error information by detecting an error pin interrupt, where the error pin interrupt is generated by a hardware platform upon occurrence of a correctable error in the memory.

In other embodiments, the first error information acquisition module 110 is configured to collect correctable error information by polling the memory controller before acquiring uncorrectable error information.

In some embodiments, the failure address acquisition module 140 is configured to call the PRM processing module via a PRM interface to enable the PRM processing module to acquire the memory failure address information corresponding to the triggering of the system control interrupt.

In some embodiments, the failure address acquisition module 140 is configured to call the PRM interface to acquire a globally unique identifier of the PRM processing module and calling the PRM processing module according to the globally unique identifier.

In some embodiments, the failure address acquisition module 140 is configured to query the first address of the PRM processing module from the first preset table according to the globally unique identifier, and to call the PRM processing module according to the first address.

In some embodiments, after acquiring the memory failure address information, the failure address acquisition module 140 is further configured to record the memory failure address information in a second preset table.

In some embodiments, the address isolation module 150 is configured to acquire the memory failure address information from the second preset table, and perform an address isolation operation according to the memory failure address information.

In some embodiments, the correctable error information includes memory failure address information; a control interrupt trigger module 130 configured to determine whether an error type characterized by the prediction result is a specific error type; where the specific error type includes at least one of a risky cell error, a risky row error, and a risky chip failure; if so, a system control interrupt is triggered.

In some embodiments, when the SMI processing module increases the memory refresh rate, a value of the memory refresh rate is set to a target frequency value; the target frequency value is twice the specific frequency value.

In some embodiments, the refresh rate increasing module is configured to monitor the power management integrated circuit information of the memory, and acquire the power supply voltage value from the power management integrated circuit information.

For a specific definition of a memory failure processing apparatus, reference might be made to the above definition of the memory failure processing method, which will not be described in detail here. The various modules of the aforementioned memory failure processing apparatus may be implemented wholly or partially by software, hardware, or a combination thereof. The modules may be embedded in hardware or separate from the processor in the computer device, or may be stored in software in a memory in the computer device, such that the processor invokes operations corresponding to the modules.

Figure 7:
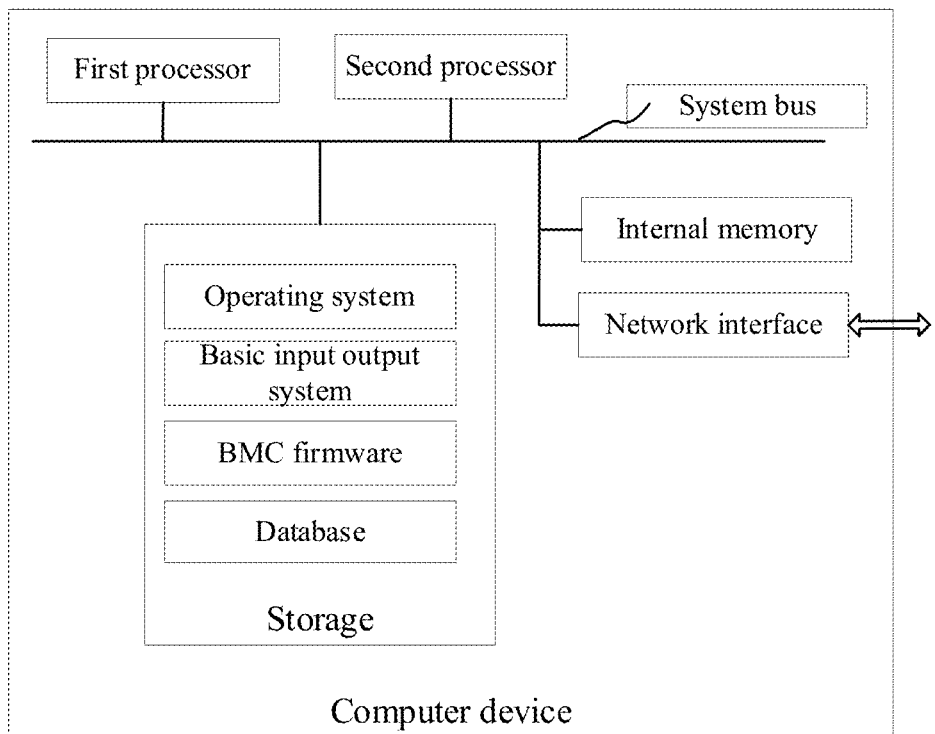
FIG. 7 is a schematic internal structure diagram illustrating a computer device according to one or more embodiments of the present application.

The present application provides, in some embodiments, a computer device, an internal structural diagram of which may be as illustrated in FIG. 7. The computer device includes a memory, a first processor, a second processor, and an internal memory (i.e., internal storage), where the memory stores an operating system and a basic input output system executable on the first processor, and BMC firmware executable on the second processor.

The second processor is configured to acquire correctable error information of a memory; perform an out-of-band memory failure prediction operation according to the correctable error information; according to a prediction result, determine whether to trigger a system control interrupt;

the first processor is configured to, in response to the system control interrupt, call a PRM processing module to acquire memory failure address information and perform an address isolation operation according to the memory address information.

In some embodiments, the computer device is a server. The aforementioned second processor is a BMC chip, and the BMC chip may in some embodiments be an Advanced RISC Machine (ARM) chip.

In some embodiments, when calling the PRM processing module to acquire the memory failure address information corresponding to the triggering of the system control interrupt, the first processor is configured to call the PRM processing module to interact with the second processor to acquire memory failure address information corresponding to the triggering of the system control interrupt.

In some embodiments, the first processor calls the PRM processing module via the PRM interface.

In some embodiments, the PRM interface includes a first method and a first driver module; when calling the PRM processing module via the PRM interface, the first processor is configured to acquire a globally unique identifier of the PRM processing module through the first method, and transmit the globally unique identifier to a PRM buffer; and The first driver module acquires the globally unique identifier from the PRM buffer through the first driver module, and calls the PRM processing module according to the globally unique identifier.

In some embodiments, the second processor is further configured to acquire a power supply voltage value of the memory after acquiring the correctable error information, trigger a first system management interrupt in response to the power supply voltage value being less than a preset voltage threshold, and in response to the first system management interrupt, increase a memory refresh rate.

In some embodiments, the second processor is further configured to acquire uncorrectable error information of the memory and perform a memory health scoring operation and an information display operation according to the uncorrectable error information.

In some embodiments, the second processor is configured to, in response to a second system management interrupt triggered by the hardware platform upon occurrence of an uncorrectable error in the memory, acquire the uncorrectable error information generated by the hardware platform, before the second processor acquires the uncorrectable error information.

In some embodiments, the second processor is configured to, before acquiring correctable error information, collect the correctable error information by detecting an error pin interrupt, where the error pin interrupt is generated by a hardware platform upon occurrence of a correctable error in the memory.

In other embodiments, the second processor is configured to collect the correctable error information by polling the memory controller before acquiring correctable error information.

In some embodiments, when calling the PRM processing module to acquire the memory failure address information corresponding to the triggering of the system control interrupt, the first processor is configured to calling the PRM processing module via a PRM interface to enable the PRM processing module to acquire the memory failure address information corresponding to the triggering of the system control interrupt.

In some embodiments, when calling the PRM processing module via the PRM interface, the first processor is configured to call the PRM interface to acquire a globally unique identifier of the PRM processing module and call the PRM processing module according to the globally unique identifier.

In some embodiments, when calling the PRM processing module according to the globally unique identifier, the first processor is configured to acquire a first address of the PRM processing module by querying a first preset table according to the globally unique identifier; and call the PRM processing module according to the first address.

In some embodiments, after acquiring the memory failure address information, the first processor is further configured to record the memory failure address information in a second preset table.

In some embodiments, when performing an address isolation operation according to the memory failure address information, the first processor is configured to acquire the memory failure address information from the second preset table, and perform an address isolation operation according to the memory failure address information.

In some embodiments, the correctable error information includes memory failure address information; accordingly, when determining whether to trigger a system control interrupt according to the prediction result, the second processor is configured to determining whether an error type characterized by the prediction result is a specific error type; where the specific error type includes a risky cell error, a risky row error, and a risky chip failure; and if so, a system control interrupt is triggered.

In some embodiments, when the second processor increases the memory refresh rate, the memory refresh rate is set to a target frequency value; the target frequency value is twice the specific frequency value.

In some embodiments, the second processor is configured to monitor the power management integrated circuit information of the memory, and acquire the power supply voltage value from the power management integrated circuit information.

In some embodiments, the computer device includes a first processor, a second processor, a storage, a memory (i.e., an internal memory), a network interface, and a database which are all interconnected via a system bus. The first processor and the second processor of the computer device are configured to provide computing and control capabilities. The memory of the computer device may be a non-transitory storage medium. The non-transitory storage medium stores programs including an operating system, a basic input output system, BMC firmware, and a database. The internal memory provides an environment for the operation of an operating system, a basic input output system, BMC firmware, and other programs in the non-transitory storage medium. The data in some embodiments stored in the database of the computer device may be defined according to the embodiments of the method described above. The network interface of the computer device is used for communicating with an external terminal through a network connection.

A person skilled in the art will appreciate that the structure illustrated in FIG. 7 is merely a block diagram of a portion of the structure related to the solution of the present application and does not limit the computer device to which the solution of the present application is applied. A specific computer device may include more or fewer components than those shown in the figure, or combine certain components, or have a different arrangement of components.

Figure 8:
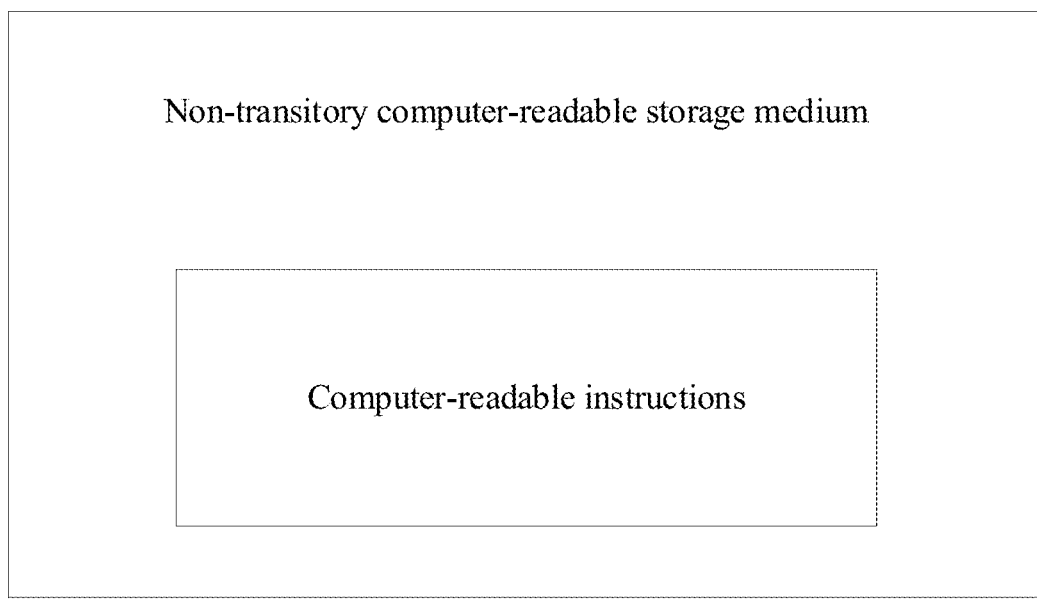
FIG. 8 is a schematic structural diagram illustrating a storage medium according to one or more embodiments of the present application.

Referring to FIG. 8, the present application, in some embodiments, further provides a non-transitory computer-readable storage medium having stored thereon computer-readable instructions that, when executed by a processor, implement the steps of the memory failure processing method provided in any of the aforementioned embodiments.

In the above-mentioned embodiments of the present application, the description of each embodiment has its own emphasis, and reference might be made to the description of described in detail might be referred to the description of other embodiments.

It will be appreciated by a person skilled in the art that all or part of the processes for implementing the above method embodiments may be implemented by computer-readable instructions stored in a non-transitory computer-readable storage medium that, when executed, may include the processes of the embodiments of the methods as described above. Any reference to memory, storage, databases, or other media used in the various embodiments provided herein may include, among other things, nonvolatile and/or volatile memory. Non-transitory memory may include read only memory (ROM), programmable ROM (PROM), electrically programmable ROM (EPROM), electrically erasable programmable ROM (EEPROM), or flash memory. Volatile memory may include random access memory (RAM) or external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink, DRAM (SLDRAM), Rambus direct RAM (RDRAM), direct rambus dynamic RAM (DRDRAM), and a memory bus dynamic RAM (RDRAM) or the like.

Each technical feature of the above-mentioned embodiments might be combined in any combination, and in order to make the description concise, not all the possible combinations of each technical feature in the above-mentioned embodiments are described; however, as long as there is no contradiction between the combinations of these technical features, they should be considered as the scope of the description.

The embodiments described above represent only a few embodiments of the present application and are described in more detail and are not to be construed as limiting the scope of the application. It should be noted that several variations and modifications might be made by a person skilled in the art without departing from the inventive concept, which is within the scope of the present application. Accordingly, the protection sought in the present application is as set forth in the claims below.

What is claimed is:

1. A memory failure processing method, comprising:
acquiring correctable error information of a memory via a baseboard management controller;
performing an out-of-band memory failure prediction operation according to the correctable error information;
according to a prediction result, determining whether to trigger a system control interrupt;
wherein a method of triggering the system control interrupt is pre-selected from a plurality of triggering methods according to an actual application scenario, wherein the plurality of triggering methods comprises triggering the system control interrupt via a general input output interface and triggering the system control interrupt via a virtual wire, and wherein any of the triggering methods is implemented without connecting an error pin of a central processing unit to the general input output interface of a platform controller hub;
in response to the system control interrupt, calling a platform runtime mechanism (PRM) processing module to acquire memory failure address information corresponding to a triggering of the system control interrupt; and
performing an address isolation operation according to the memory failure address information; and wherein
the calling the PRM processing module to acquire memory failure address information corresponding to the triggering of the system control interrupt comprises:
calling the PRM processing module via a PRM interface to enable the PRM processing module to acquire the memory failure address information corresponding to the triggering of the system control interrupt.

2. The method according to claim 1, wherein after acquiring the correctable error information, the method further comprises:
acquiring a power supply voltage value of the memory, and triggering a first system management interrupt in response to the power supply voltage value being less than a preset voltage threshold; and
in response to the first system management interrupt, increasing a memory refresh rate.

3. The method according to claim 1 further comprising:
acquiring uncorrectable error information of the memory and performing a memory health scoring operation and an information display operation according to the uncorrectable error information.

4. The method according to claim 3, wherein before acquiring the uncorrectable error information, the method further comprises:
in response to a second system management interrupt triggered by a hardware platform upon occurrence of an uncorrectable error in the memory, acquiring the uncorrectable error information generated by the hardware platform.

5. The method according to claim 1, wherein before acquiring the correctable error information, the method further comprises:
collecting the correctable error information by detecting an error pin interrupt, wherein the error pin interrupt is generated by a hardware platform upon occurrence of a correctable error in the memory.

6. The method according to claim 1, wherein before acquiring the correctable error information, the method further comprises:
collecting the correctable error information by polling a memory controller.

7. The method according to claim 1, wherein the calling the PRM processing module via the PRM interface comprises:
calling the PRM interface to acquire a globally unique identifier of the PRM processing module and calling the PRM processing module according to the globally unique identifier.

8. The method according to claim 7, wherein the calling the PRM processing module according to the globally unique identifier comprises:
acquiring a first address of the PRM processing module by querying a first preset table according to the globally unique identifier; and
calling the PRM processing module according to the first address.

9. The method according to claim 1, wherein after acquiring the memory failure address information, the method further comprises:
recording the memory failure address information in a second preset table.

10. The method according to claim 9, wherein the performing the address isolation operation according to the memory failure address information comprises:
acquiring the memory failure address information from the second preset table, and performing an address isolation operation according to the memory failure address information.

11. The method according to claim 1, wherein the correctable error information comprises memory failure address information;
the according to the prediction result, determining whether to trigger the system control interrupt comprises:
determining whether an error type characterized by the prediction result is a specific error type, wherein the specific error type comprises at least one of a risky cell error, a risky row error, and a risky chip failure; and
in response to that the error type characterized by the prediction result is a specific error type, triggering the system control interrupt.

12. The method according to claim 2, wherein when increasing the memory refresh rate, setting a value of the memory refresh rate to a target frequency value; wherein the target frequency value is twice a specific frequency value; and wherein the specific frequency value refers to a memory refresh rate set for a memory with a normal voltage value according to an actual application scenario.

13. The method according to claim 2, wherein the acquiring the power supply voltage value of the memory comprises:
monitoring power management integrated circuit information of the memory, and acquiring the power supply voltage value from the power management integrated circuit information.

14. The method according to claim 1, wherein the calling the PRM processing module to acquire memory failure address information corresponding to the triggering of the system control interrupt comprises:
an operating system calling the PRM processing module in a basic input output system via a PRM interface, the PRM processing module acquiring the memory failure address information corresponding to the triggering of the system control interrupt from the baseboard management controller and transmitting the memory failure address information to the operating system.

15. A non-transitory computer-readable storage medium having computer-readable instructions stored thereon, wherein the computer-readable instructions, when executed by a processor, are configured to cause the processor to perform operations comprising:
acquiring correctable error information of a memory via a baseboard management controller;
performing an out-of-band memory failure prediction operation according to the correctable error information;
according to a prediction result, determining whether to trigger a system control interrupt;
wherein a method of triggering the system control interrupt is pre-selected from a plurality of triggering methods according to an actual application scenario, wherein the plurality of triggering methods comprises triggering the system control interrupt via a general input output interface and triggering the system control interrupt via a virtual wire, and wherein any of the triggering methods is implemented without connecting an error pin of a central processing unit to the general input output interface of a platform controller hub;
in response to the system control interrupt, calling a platform runtime mechanism (PRM) processing module to acquire memory failure address information corresponding to a triggering of the system control interrupt;
performing an address isolation operation according to the memory failure address information; and
calling the PRM processing module via a PRM interface to enable the PRM processing module to acquire the memory failure address information corresponding to the triggering of the system control interrupt.

16. The memory failure processing method according to claim 1, wherein the memory comprises a plurality of memory modules, each of the plurality of memory modules comprises a plurality of channels, each of the plurality of channels comprises a plurality of ranks, each of the plurality of ranks comprises a plurality of banks, each of the plurality of banks is a matrix formed by a plurality of rows and columns of cells.

17. The memory failure processing method according to claim 16, wherein the memory modules comprise Dual-Inline-Memory-Modules (DIMM).

* * * * *